United States Patent [19]

Kniesly et al.

[11] 3,909,619

[45] Sept. 30, 1975

[54] CONTROL FOR ACTIVATING MOTOR VEHICLE ELECTRICAL LOAD

[75] Inventors: Richard A. Kniesly, Kokomo; Larry L. Colville; Jerrold L. Mullen, both of Anderson, all of Ind.

[73] Assignee: Ko An, Inc., Kokomo, Ind.

[22] Filed: May 17, 1974

[21] Appl. No.: 470,971

[52] U.S. Cl.................. 307/10 LS; 340/62; 315/83
[51] Int. Cl.².......................................... B60Q 1/02
[58] Field of Search......... 307/10 R, 10 LS; 315/83, 315/82, 77; 340/62; 180/105

[56] References Cited
UNITED STATES PATENTS

| | | | |
|---|---|---|---|
| 3,497,708 | 2/1970 | Daugherty | 315/83 X |
| 3,767,966 | 10/1973 | Bell | 315/83 |
| 3,769,519 | 10/1973 | Adamian | 315/83 X |

Primary Examiner—Herman J. Hohauser
Attorney, Agent, or Firm—Woodard, Weikart, Emhardt & Naughton

[57] ABSTRACT

A control for activating an electrical load, such as a lighting system, in a motor vehicle having an ignition system. A first voltage, inversely proportional to the frequency of the motor vehicle ignition pulses, is applied to the anode of a programmable unijunction transistor (PUT), and a fixed reference voltage is applied to the gate of the PUT. At low engine speeds, the PUT tends to conduct periodically, deactivating a relay which is operable to energize the motor vehicle headlights. At higher engine speeds, with a greater frequency of ignition pulses, the programmable unijunction transistor fires less frequently, or not at all, allowing the energization of the headlight relay and hence, the application of power to the headlights. Circuitry is also provided to energize the motor vehicle headlights, taillights and instrument lights in response to the activation of the motor vehicle windshield wiper motor and also in response to ambient darkness.

13 Claims, 7 Drawing Figures

CONTROL FOR ACTIVATING MOTOR VEHICLE ELECTRICAL LOAD

BACKGROUND OF THE INVENTION

1. Field of the Invention

The invention is in the field of control for activating electrical loads in motor vehicles.

2. Description of the Prior Art

In the past, several systems have been proposed for activating the headlights of a motor vehicle in response to engine and/or vehicle speed. Some of such devices have incorporated optical and mechanical means such as lights and photosensitive devices mounted on a speedometer. Devices using such mechanical and/or optical modifications to a motor vehicle speedometer in order to control vehicle lighting are shown in U.S. Pat. No. 3,310,774 to Marian, U.S. Pat. No. 3,732,539 to Easterly, and U.S. Pat. No. 3,171,058 to Ono.

Systems have also been proposed which utilize ignition pulses, indicative of engine speed, to bias on electronic switching devices, and therefore to activate relays which in turn energize an electrical load. Such systems are shown in U.S. Pat. No. 3,497,708 to Daugherty and U.S. Ser. No. 308,474, filed Nov. 21, 1972, and assigned to the assignee of the present application. These systems do not show the use of a reference voltage, for comparison purposes with the voltage produced by ignition pulses, not do these prior art systems show the combination of a control system responsive to engine speed with circuitry responsive to changes in ambient light or the activation of the motor vehicle windshield wipers.

SUMMARY OF THE INVENTION

One embodiment of the present invention is a control for an electrical load in a motor vehicle having an ignition system comprising a motor vehicle electrical load circuit, control means for coupling electrical power to the load circuit when energized, first circuit means, having an input coupled to the ignition pulses in the ignition system, for producing at an output a first electrical signal dependent upon the frequency of the ignition pulse, reference circuit means for producing at an output a reference electrical signal, and second circuit means, having a first input coupled to the output of the first circuit means and having a second input coupled to the output of the reference circuit means, for energizing the control means when the first electrical signal differs from the reference electrical signal by a predetermined amount.

It is an object of the present invention to provide an electrical load control for activating a motor vehicle electrical load which is responsive to the engine speed of the motor vehicle and also to the activation of the motor vehicle windshield wipers and ambient darkness.

It is a further object of the present invention to provide a control for an electrical load in a motor vehicle which is responsive to the engine speed of the motor vehicle and which is operable to compare a voltage dependent upon the ignition pulses of the motor vehicle with a fixed reference voltage and to energize the electrical load when the ignition signal differs from the reference signal by a predetermined amount.

Further objects and advantages of the present invention shall be apparent from the following description and accompanying figures.

DESCRIPTION OF THE PREFERRED EMBODIMENT

Figure 1:
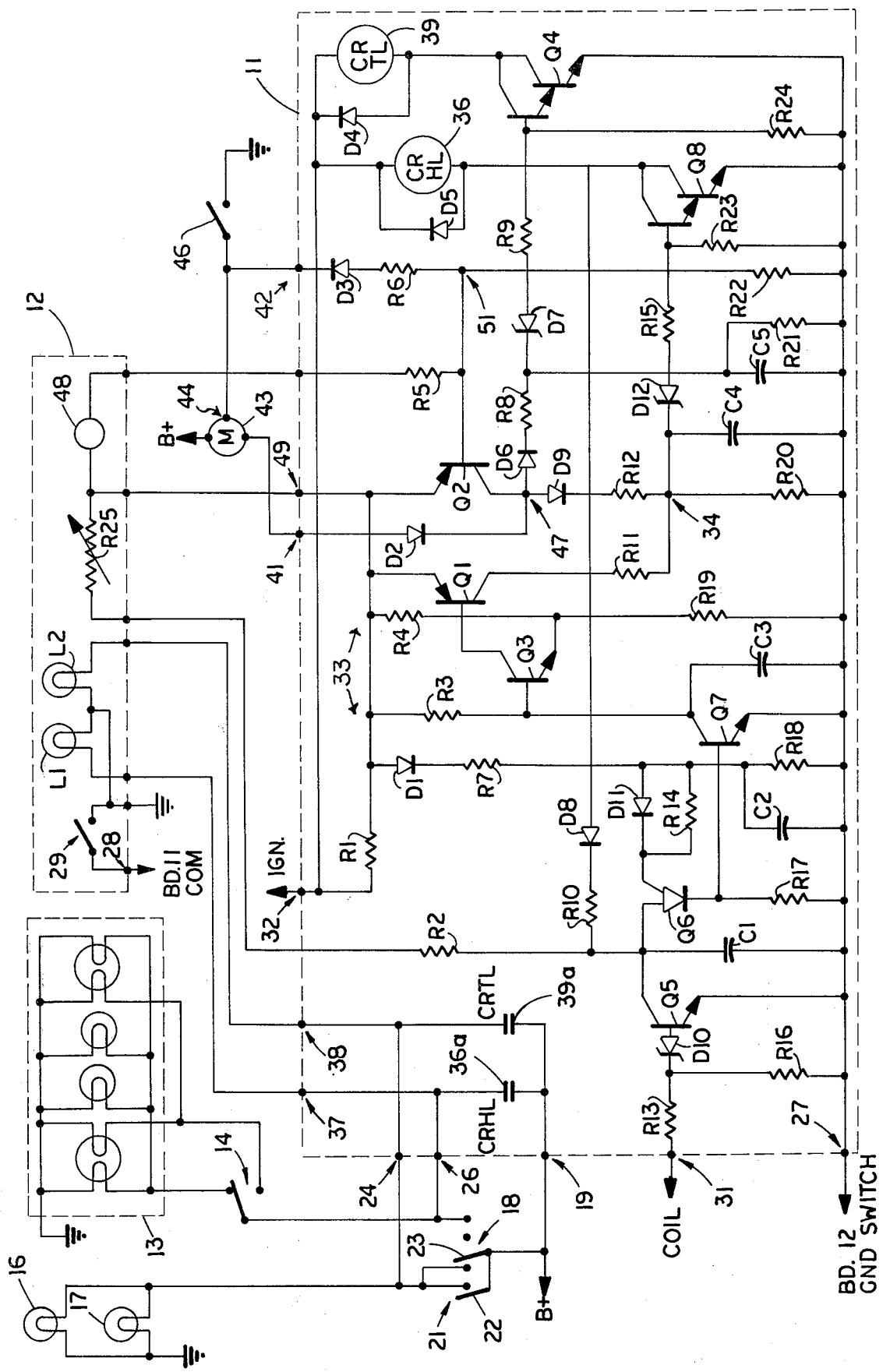
FIG. 1 is a schematic diagram of an embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a control for an electrical lighting circuit in a motor vehicle according to the present invention. The control comprises circuit section 11, arranged on a first circuit board, and circuit section 12, which includes indicators and controls and is mounted in a suitable housing as described hereinafter. Also shown in FIG. 1 is a standard headlight circuit 13 connected to high-low beam switch 14. A standard motor vehicle taillight circuit is represented at 16 and a standard motor vehicle instrument light circuit is designated as 17.

The motor vehicle B+ voltage, for example 12 volts, is supplied from the motor vehicle battery and generator power source circuitry to terminal 18 of standard vehicle light switch 21 and also to terminal 19 of circuit section 11. As shown in FIG. 1, light switch 21 is in the off or open position. When ganged contacts 22 and 23 are moved to the right, as viewed in FIG. 1, to a first position, taillights 16 and instrument lights 17 are energized while the bank of headlights 13 remain off. If contacts 22 and 23 are moved further to the right, the taillights are instrument lights remain energized from the DC power source and the headlights are now also energized through high-low beam switch 14, which is shown in the high beam position in FIG. 1.

Power may also be supplied to taillights 16 and instrument lights 17 from circuit section 11 through terminal 24, and the headlights may be energized by circuit section 11 through terminal 26 as shown. Common terminal 27 for circuit section 11 is connected to switch 29 in circuit section 12 through terminal 28. Switch 29 serves as a master switch for the control circuitry in that switch 20 must be closed to provide a ground for the control circuit. If switch 29 is open, there is no ground for most of the circuitry in circuit section 11 and the circuit will be inoperative and in a "floating" condition.

In the embodiment of FIG. 1, circuitry is provided for the activation of the motor vehicle lighting circuits in response to a plurality of conditions. The control of FIG. 1 is operable to turn on the vehicle headlights upon attainment of a certain vehicle speed, turn on the vehicle headlights, taillights and instrument lights when the ambient lighting diminishes to a certain level, and turn on the vehicle headlights, taillights and instrument lights when the vehicle windshield wipers are in operation. Various indicators and controls ancillary to these functions are also provided.

The operation of the control in response to motor vehicle engine speed shall be described first. Since the speed of the motor vehicle corresponds closely to the motor vehicle engine speed, the control circuit serves essentially to activate the motor vehicle headlights in response to the vehicle speed. Momentary fluctuations in the engine speed do not disturb the control circuit as will be apparent from the following description.

Terminal 31 of circuit section 11 is coupled to a point between the distributor contact points and ignition coil of the motor vehicle, thereby receiving a series of positive pulses whose frequency is dependent upon the engine speed of the motor vehicle when it is running. A portion of the voltage of the pulses, determined by the voltage divider of R13 and R16, is coupled through Zener diode D10 to the extent that it exceeds the Zener voltage. As stated earlier, switch 29 in circuit section 12 must be closed in order to provide a ground for circuit section 11 so that the control may be operable. Terminal 32 of circuit section 11 is connected to the "run" terminal of the motor vehicle ignition switch, the terminal which is energized by the B+ voltage of the motor vehicle only when the motor vehicle ignition switch is in the run position. This B+ power is coupled from the terminal 32 through resistor R1 to node 33 and then through variable resistor R25 of circuit section 12 to resistor R2, charging capacitor C1. The charging time for C1 may be varied by adjusting the value of R25 in circuit section 12. While C1 is charging, pulses through diode D10 turn transistor Q5 on, discharging C1. Thus, as so far described, the voltage on C1 will be in a saw-tooth pattern with its peak value dependent upon the charging rate set by R1, R2, R25 and C1 and also upon the frequency at which Q5 is turned on by pulses from the ignition coil of the motor vehicle.

Simultaneously, when the motor vehicle engine is running, DC voltage is applied through terminal 32 and resistor R1 to node 33 and then through temperature compensating diode D1 to the voltage divider comprising R7 and R18. Capacitor C2 is in parallel with R18, serving as a ripple filter, and together with R18 is coupled to the gate of programmable unijunction transistor Q6 through temperature compensating and current controlling diode D11 and resistor R14. This places a reference voltage at the gate of PUT Q6. The anode of Q6 is connected to charging capacitor C1, whose waveform has previously been described. The operation of programmable unijunction Q6 is such that when the voltage at its anode exceeds the reference voltage at its gate, Q6 conducts heavily turning on transistor Q7. PUT Q6 remains on until the voltage on discharging capacitor C1 is again lower than the reference voltage at its gate.

In the absence of the gating on of transistor Q7, capacitor C3 charges towards the potential at node 33 through R3. If the motor vehicle engine speed has been slow, resulting in a low frequency of ignition pulses to turn on transistor Q5, capacitor C1 will frequently charge to the point that the anode of Q6 is at a higher potential than its gate, turning Q6 and Q7 on, thereby discharging C3. If, however, the engine speed and frequency of ignition pulses is sufficient to frequently discharge C1 and prevent the firing of Q6 and Q7, capacitor C3 charges to a point at which transistor Q3 is turned on, coupling the base of Q1 to a potential lower than that at node 33, such lower potential being determined by resistors R4 and R19 in a divider arrangement. Since the emitter of Q1 is at the potential of node 33, Q1 is biased on. With Q1 turned on, the potential at node 33 is applied through Q1 across R11, R20 and capacitor C4. The voltage across R20 is determined by the divider network of R11 and R20, with energy stored in capacitor C4. When C4 has charged to a potential greater than the Zener voltage of Zener diode D12, the Zener will conduct and power is coupled through R15, establishing a voltage across R23 which turns on Darlington transistor Q8. When Q8 conducts, power from the ignition "run" terminal is coupled through terminal 32, headlight relay coil 36 and transistor Q8.

The current through headlight relay coil 36 energizes the relay and closes the normally open contacts 36a. Voltage is then supplied from the motor vehicle B+ through terminal 19, contacts 36a, terminal 26 and switch 14 to the headlight circuit 13.

The headlights will remain on until the engine speed is reduced to a point where the frequency of ignition pulses is insufficient to discharge C1 to prevent the firing of Q6. In order to prevent oscillation of the headlights as the engine speed varies about the critical speed for energizing the headlight relay, resistor R10 and diode D8 are connected from the collector of Q8 to the charging side of C1. In this manner, when Q8 is turned off and the headlight relay is not holding the headlights on, a small current, not enough to energize headlight relay coil 36, flows through relay coil 36, diode D8 and R10 to provide a small additional charging source for C1, tending to make it easier to turn on Q6 and therefore harder to turn on headlights 13. When Q8 is conductive and headlight circuit 13 is energized, the anode of D8 is essentially grounded and this additional charging source through D8 and R10 for C1 is eliminated, whereby the headlights will de-energize at a lower speed than that at which the energize.

As shown in FIG. 1, when high-low beam switch 14 is energized, either by headlight relay contacts 36a or light switch 21, power is also supplied through terminal 37 to headlight indicator lamp L1 in circuit section 12, illuminating L1. Similarly, when taillight 16 and instrument lights 17 are energized, either through light switch 21 or taillight relay contacts 39a, as shall be described in detail hereinafter, power is also supplied through terminal 38 to taillight indicator lamp L2 in circuit section 12.

The control of FIG. 1 is also operable to activate the motor vehicle headlights and taillights in response to darkness. The voltage at node 33 is applied at terminal 49 across photocell 48 and resistors R5 and R22. The voltage at point 51 as a result of this resistive voltage divider, is near anode 33 when photocell 48 is exposed to light as the photocell's resistance is very small at such time.

Photocell 48, with the other elements of circuit section 12, are mounted in a convenient place within a housing, such as on the dashboard of the motor vehicle. Therefore, in daylight, photocell 48 will be maintained at a low resistance, and point 51 consequently will be at a relatively high voltage, and transistor Q2 will be turned off due to the high potential at its base. When photocell 48 is no longer illuminated, however, such as when it begins to become dark, the photocell resistance increases and the voltage at point 51 decreases until such time as point 51 is at a sufficient potential to turn on transistor Q2. When Q2 is turned on, potential from node 33 is coupled through Q2 to point 47, activating the headlight and taillight relay coils in the same manner as their activation by the windshield wiper motor B+, described below.

The embodiment of FIG. 1 is also operable through one of two methods to activate the motor vehicle headlights, taillights and instrument lights when the motor vehicle windshield wipers are activated. For the first method, terminal 41 of circuit section 11 is connected to a terminal of the windshield wiper motor 43 which is at the B+ voltage of the motor vehicle battery and generator circuitry when the windshield wiper motor is turned on. For the second method, terminal 42 of circuit section 11 is connected to the ground terminal 44 of the motor vehicle windshield wiper motor, which terminal is grounded through the standard motor vehicle windshield wiper switch 46 when switch 46 is closed to activate the windshield wipers. Both terminals 41 and 42, and their associated circuitry, are available in circuit section 11; but only one of the terminals need be connected to the windshield wiper circuitry, depending upon the wiring of the windshield wiper circuitry. Both connections are shown in the Figures for illustrative purposes, and both connections could be made but the additional one would be superfluous.

In the first method, when windshielf wiper motor 44 is energized, the potential at terminal 41 causes current to flow through diode D2 to junction 47, which is a common connection between the anodes of diodes D6 and D9. Current flows through both diodes. One path of current is through diode D9 and resistor R12 to the parallel combination of R20 and C4. As described above in connection with the vehicle-speed headlight activation, the positive potential at the cathode of Zener diode D12 becomes sufficient when C4 charges to cause current to flow through D12 turning on transistor Q8 and energizing headlight relay coil 36. This in turn closes headlight relay contacts 36a and applies power to headlight high-low beam switch 14 and headlight circuit 13. The other path for current from diode D2 is through diode D6 and R8 to R21 and C5, and RC pair analogous to R20 and C4. The voltage increases on C5 is sufficient to cause conduction through Zener diode D7 and resistor R9 and R24, establishing a voltage across R24 and turning on Darlington transistor Q4, energizing taillight relay coil 39. When taillight relay coil 39 is energized, relay contacts 39a close and power is supplied from the motor vehicle B+ through terminal 19, contacts 39a and terminal 24 to taillights 16 and instrument lights 17. Power is also applied through terminal 19, taillight relay contacts 39a and terminal 38 to taillight indicator lamp L2 in circuit section 12, illuminating L2.

In the second method for activating vehicle lights in response to activation of the windshield wipers, there is a circuit connection from point 51 to the windshield wiper ground through R6 and D3. The purpose of this connection is to lower the effective resistance from point 51 to ground, by adding R6 in parallel with R22, only in the case in which the windshield wiper switch is closed. This lower resistance from point 51 to ground will establish a condition wherein the photocell 48 can not hold Q2 off. Brief use of the windshielf wipers, with either method, will not energize the realy coil circuitry due to the charging times of capacitors C4 and C5 before Zener diodes D12 and D7, respectively, can conduct.

Figure 2:
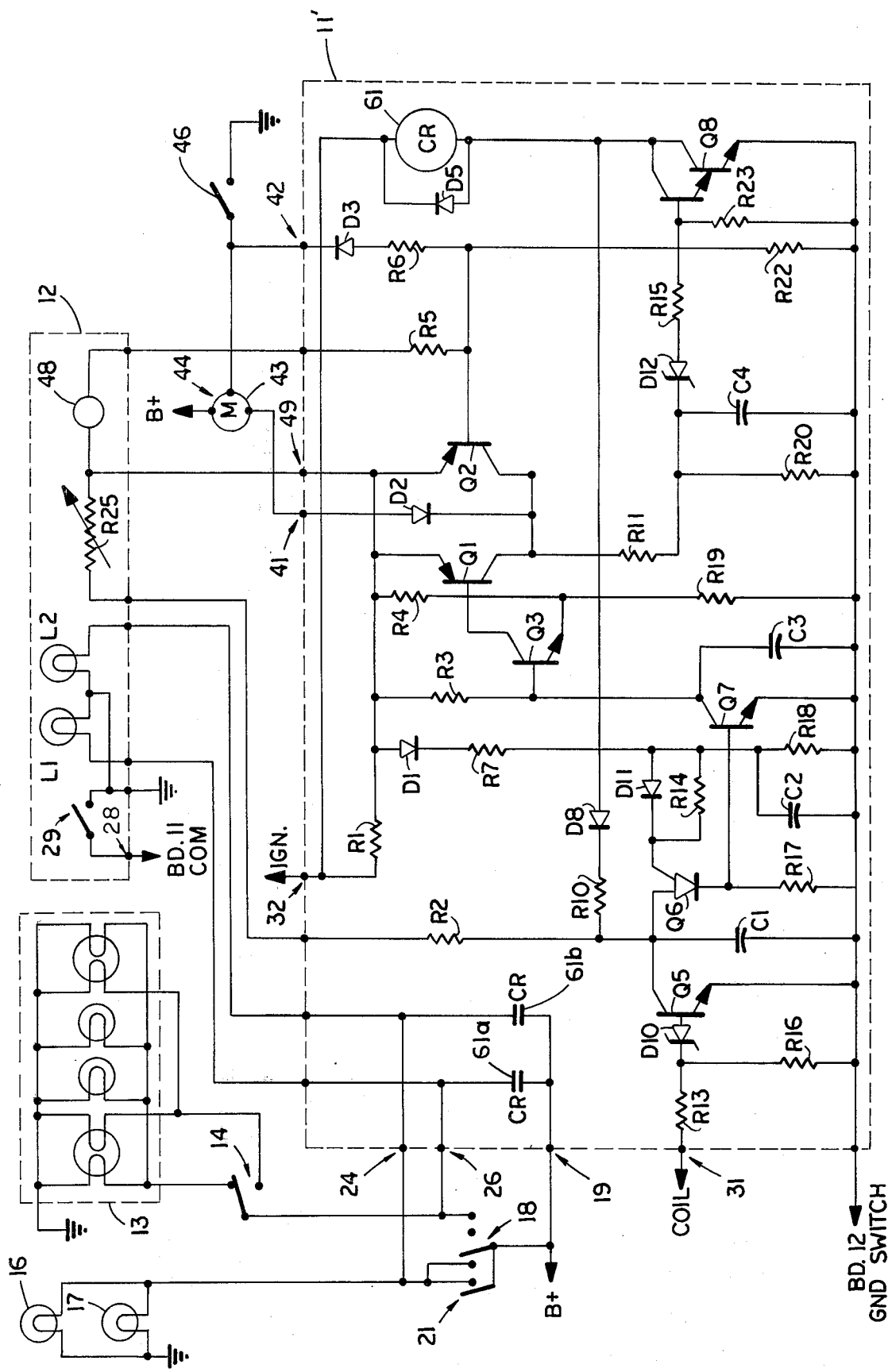
FIG. 2 is a schematic diagram of another embodiment of the present invention utilizing a single relay coil.

In FIG. 2, an embodiment similar to that of FIG. 1 is shown, with the exception that the feature of activation of healights-only due to vehicle engine speed has been eliminated. In arriving at the embodiment of FIG. 2 from that of FIG. 1. D6, R8, D7, R9, R24, Q4, D4, D9, R12 and the taillight relay have been removed. Relay coil 36 has been replaced by relay coil 61 and associated relay contacts 36a and 39a have been replaced by relay contacts 61a and 61b, respectively. In this manner, all three means of activating the headlights serve to energize a single relay, gating on the taillights (and instrument lights) and headlights of the motor vehicle by closing relay contacts 61b and 61a, respectively. Otherwise, the circuit of FIG. 2 functions in the same manner as that of FIG. 1.

Figure 3:
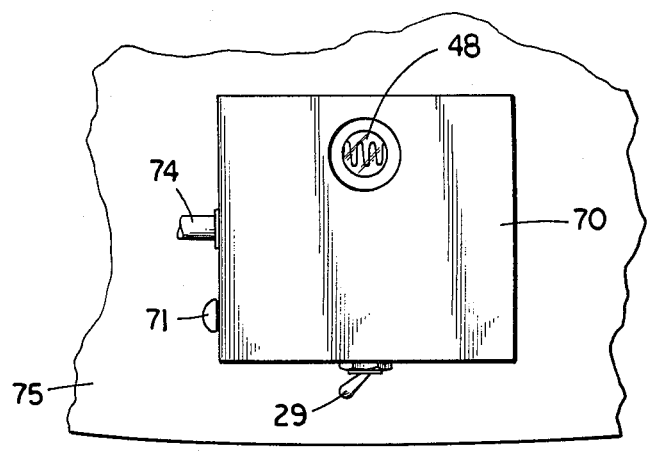
FIG. 3 is a top view of an apparatus including a section of the embodiments of FIGS. 1 and 2, mounted on the dashboard of a motor vehicle.

Referring now to FIGS. 3 through 6, there is shown a housing 70 for circuit section 12 of the control. As mentioned before, circuit section 11 may be mounted on a single circuit board and located in a convenient location such as under the dashboard of the motor vehicle out of the way of the driver. Housing 70, as shown in FIG. 3, is mounted on top of a dashboard 75, preferably at the left end of the dash adjacent the left end portion of the windshield, convenient to the driver of the motor vehicle.

Figure 7:
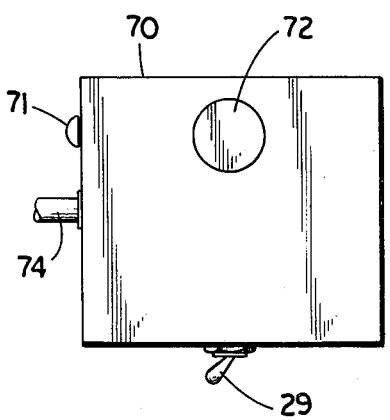
FIG. 7 is a top view of the apparatus of FIG. 3 with a light shade positioned over the photocell.

FIG. 3 is a top view of the housing 70 and shows an opening for photocell 48 and also a handle 71 for a sliding shade 72 for the photocell. As shown in FIG. 3, photocell 48 receives light through the windshield of the motor vehicle during daylight operation and, as described above, maintains a low resistance in a voltage divider, which does not provide activation of the vehicle lights. However, in ambient darkness, or if light shield 72 is moved over photocell 48 by sliding handle 71 to the position shown in FIG. 7, the resistance of photocell 48 increases and the motor vehicle lights are activated as described above.

Figure 4:
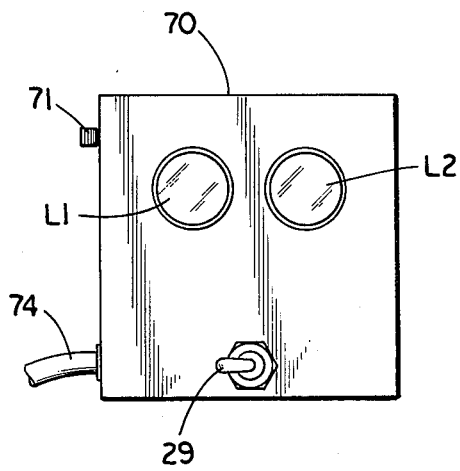
FIG. 4 is a front view of the apparatus of FIG. 3.
Figure 5:
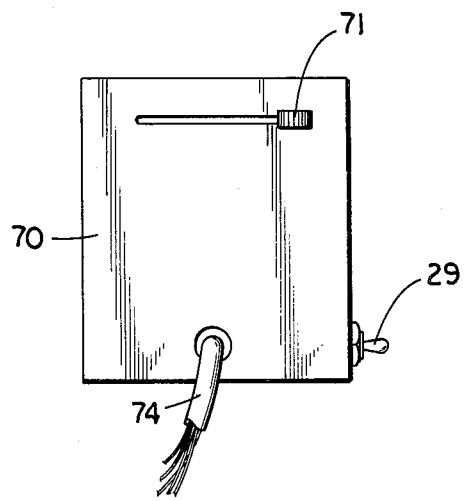
FIG. 5 is a view of a first side of the apparatus of FIG. 3.
Figure 6:
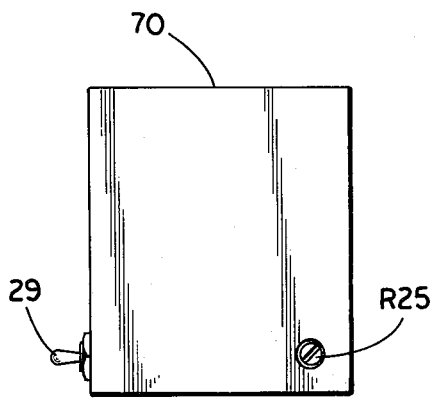
FIG. 6 is a second side view of the apparatus of FIG. 3.

In FIG. 4, there is shown a view of housing 70 from the front, as seen by the driver of the motor vehicle, showing indicator lights L1 and L2 and master switch 29. As described above, lamps L1 and L2 indicate the activation of the motor vehicle headlights and taillights, respectively, and master switch 29, when open, ungrounds the control circuitry, removing it from operation. FIG. 5 shows the left side of housing 70, including slot 73 for the movement of handle 71 attached to photocell shield 72, and also cable assembly 74 containing wires to couple circuit section 12 to circuit section 11. In FIG. 6, the right side of housing 70 is shown, including an opening for access to adjustable resistor R25 so that the speed of the vehicle engine at which the headlights are activated may be adjusted by adjusting the charging time for capacitor C1.

The invention claimed is:

1. A control for coupling electrical power to an electrical load circuit in a motor vehicle having an ignition system comprising:
a motor vehicle electrical load circuit;
control means for coupling electrical power to the load circuit when the control means is energized;
ignition circuit means, having an input coupled to ignition pulses in the ignition system of the motor vehicle, for producing at an output a first electrical signal dependent upon the frequency of the ignition pulses;
reference circuit means for producing at an output a reference electrical signal; and
comparison circuit means, having a first input coupled to the output of the ignition circuit means and having a second input coupled to the output of the reference circuit means, for energizing the control means when the first electrical signal differs from the reference electrical signal by a predetermined amount.

2. The control of claim 1 in which the comparison circuit means includes a programmable unijunction transistor whose anode is coupled to the output of the ignition circuit means and whose gate is coupled to the output of the reference circuit means.

3. The control of claim 1 in which the motor vehicle electrical load circuit is a lighting circuit.

4. The control of claim 3 in which the comparison circuit means includes a programmable unijunction transistor.

5. The control of claim 4 in which the anode of the programmable unijunction transistor is coupled to the output of the ignition circuit means, and the gate of the programmable unijunction transistor is coupled to the output of the reference circuit means, and in which the comparison circuit means further includes transistor switching means, having an input coupled to the cathode of the programmable unijunction transistor, for energizing the control means in the absence of conduction by the programmable unijunction transistor.

6. The control of claim 5 in which the control means includes a first relay having a coil and the transistor switching means includes a first capacitor coupled to the motor vehicle electrical power source and a first NPN transistor coupled in parallel with the first capacitor at its collector and emitter terminals, the base of the first transistor being coupled to the cathode of the programmable unijunction transistor, whereby the first capacitor is discharged when the first transistor is activated by conduction of the programmable unijunction transistor.

7. The control of claim 6 in which the transistor switching means further includes a series of transistor switches operable to be gated on when the charge on the first capacitor exceeds a predetermined amount, the series of transistor switches including a final transistor switch in series with the coil of the first relay.

8. The control of claim 7 in which the ignition circuit means includes a capacitor charging through a variable resistance, the positive terminal of the capacitor being coupled to the anode of the programmable unijunction transistor and also to the collector of an NPN transistor whose emitter is coupled to ground and whose base is coupled to the ignition pulses of the motor vehicle.

9. The control of claim 8 in which a resistor is coupled between the side of the relay coil which is at lower potential and the higher potential side of the capacitor of the ignition circuit means.

10. The control of claim 1, in which the control means includes an input through which the control means may be energized, and further comprising a windshield wiper motor having a first terminal which is energized by the motor vehicle power source when the windshield wiper motor is in operation, the first terminal of the windshield wiper motor being coupled to the input of the control means.

11. The control of claim 10 which further comprises:
photosensitive means for producing an electrical signal dependent upon the level of ambient light of the motor vehicle; and
electronic switching means for energizing the control means when the electrical signal from the photosensitive means exceeds a certain value.

12. The control of claim 11 in which the photosensitive means includes a photocell and the reference circuit means includes a variable resistor, and further comprising:
means for preventing energization of the control means, including a master control switch; and
and indicator lamp coupled to the electrical lighting circuit at a point which is energized by the motor vehicle electrical power source when the lighting circuit is energized.

13. The control of claim 12 which further comprises:
a housing mounted on the dashboard of the motor vehicle, the photocell, variable resistor, indicator lamp and master control switch being mounted in externally accessible locations in the housing;
a light shield slidably mounted within the housing and operable to be moved over the photocell, shielding the photocell from ambient light; and
electrical conductor means for coupling elements in the housing to the remainder of the control circuitry.

* * * * *

UNITED STATES PATENT AND TRADEMARK OFFICE
CERTIFICATE OF CORRECTION

PATENT NO. : 3,909,619
DATED : September 30, 1975
INVENTOR(S) : Richard Kniesly, Larry Colville, & Jerrold Mullen It is certified that error appears in the above-identified patent and that said Letters Patent are hereby corrected as shown below:

In column 1, line 29, please change "not" to --nor--.

In column 2, line 66, please change "20" to --29--.

In column 6, line 17, please change "healights" to --headlights--.

In column 8, line 40, please change "and" to --an--.

Please add new claim 22, as submitted in the Rule 312 Amendment on April 30, 1975 as follows:

-- 14. The control of claim 1 which further comprises:

photosensitive means for producing an electrical signal dependent upon the level of ambient light of the motor vehicle; and electronic switching means for energizing the control means when the electrical signal from the photosensitive means exceeds a certain value.--

On the cover sheet, under the Abstract, "13 Claims" should read -- 14 Claims --.

Signed and Sealed this twenty-seventh Day of April 1976

[SEAL]

Attest:

RUTH C. MASON
*Attesting Officer*

C. MARSHALL DANN
*Commissioner of Patents and Trademarks*